June 7, 1932.　　　J. H. TROMANHAUSER　　　1,861,486

OVERRUNNING CLUTCH

Filed Aug. 19, 1931

Inventor
J. H. Tromanhauser
By J. Edw. Maybee
ATTY

Patented June 7, 1932

1,861,486

UNITED STATES PATENT OFFICE

JESSE H. TROMANHAUSER, OF TORONTO, ONTARIO, CANADA

OVERRUNNING CLUTCH

Application filed August 19, 1931. Serial No. 558,097.

This invention relates to over-running friction clutches particularly adapted for use in free-wheel automobile transmission gears and my object is to devise a clutch which will be of rugged construction, which will have few parts, which will provide quick grip and quick release, and which, with a minimum of movement between the relatively moving parts, will effect a very effective drive and which will provide for a very large amount of take up, to compensate for any wear which may take place of the engaging surfaces in use.

I attain my object by means of a construction which may be briefly described as follows: The driven shaft carries a drum having an internal annular friction surface. Within this drum are positioned a plurality of clutch shoes which are movably mounted on a hub loose on the driving shaft. On the end of the driving shaft is formed a cam adapted to engage the clutch shoes when the shaft is rotated to push the shoes outwardly into frictional engagement with the friction surface of the drum.

Figure 1:
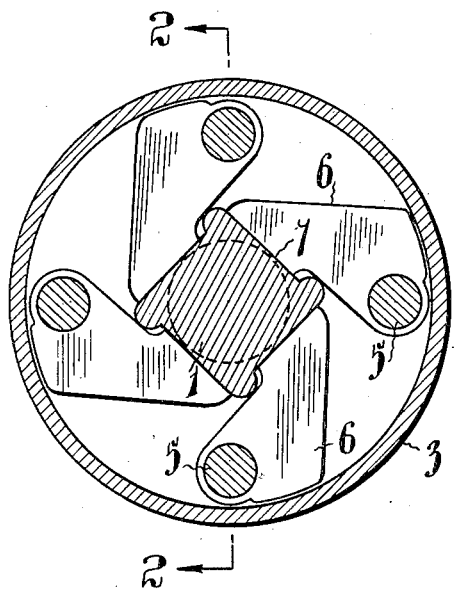
Figure 2:
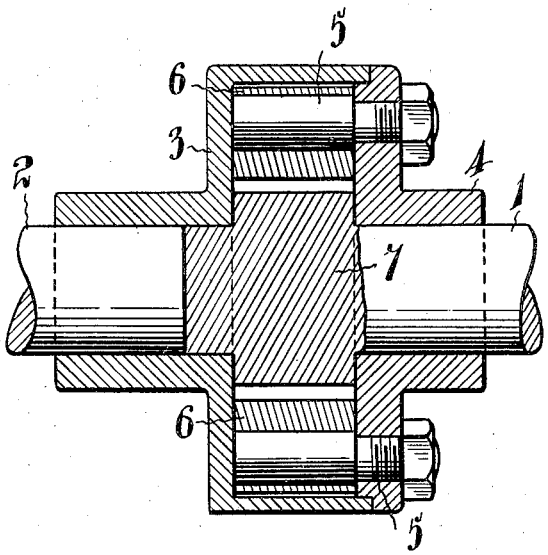
Figure 3:
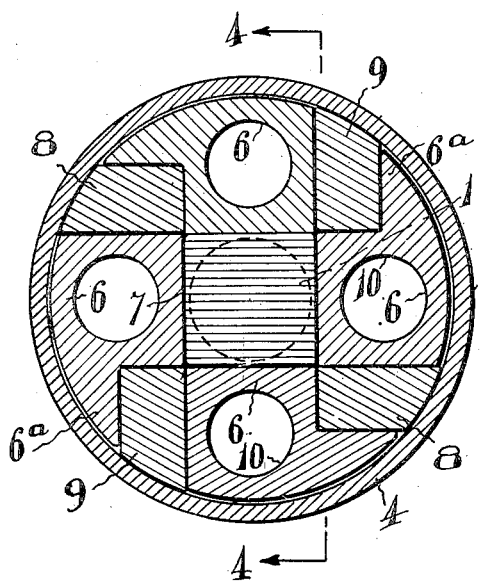

The invention is hereinafter more specifically described and illustrated in the accompanying drawing in which Fig. 1 is a cross section through one form of my improved clutch;

Fig. 2 a longitudinal section on the line 2—2 in Fig. 1;

Fig. 3 a cross section of a greatly modified form of clutch; and

Figure 4:
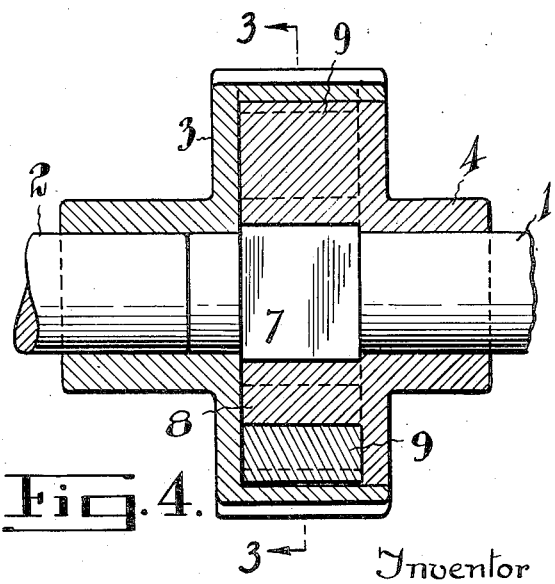

Fig. 4 a section taken on the line 4—4 in Fig. 3.

In the drawing like numerals of reference indicate corresponding parts in the different figures.

In both forms of my invention 1 is the drive shaft and 2 the driven shaft which are arranged in alinement. To the shaft 2 is secured the drum 3, the inner periphery of which forms a friction surface.

On the drive shaft is mounted a hub 4, the hub 4 and drive shaft 1 being rotatable relative one to the other. Referring now particularly to the form of my invention shown in Figs. 1 and 2, the hub 4 is provided with a series of pivot pins 5, on each of which is mounted a clutch shoe 6 each of which is arranged to engage the friction surface of the drum 3.

The clutch shoes 6 are actuated by means of a cam 7 formed on or secured to the drive shaft 1. The operation of this construction is as follows: As the drive shaft is rotated the cam portion 7 also rotates relative to the drum 3 and the clutch shoes 6, which are in the nature of levers, are rocked to engage their bearing surfaces with the bearing surface of the drum 3, causing the rotation of the hub 4 and drum 3 and with the latter the driven shaft 2. If, however, the driven shaft over-runs the drive shaft the clutch shoes are released, and the drum 3 with the shaft 2 is therefore allowed to move at a faster rate than the drive shaft.

In the form of my invention shown in Figs. 3 and 4 the clutch shoes are slidably mounted between guides 8 and 9 formed on or secured to the hub 4. These clutch shoes 6 are forced outwardly by a cam 7 formed on or secured to the drive shaft 1 in the same manner as the lever clutch shoes shown in Figs. 1 and 2. In order to give lightness these clutch shoes 6 are provided with holes or recesses 10.

Owing to the shape of the cam 7 and the contacting portions of the shoes 6 there is ordinarily a tendency for the shoes 6 to rock. It will be noted therefore, that the shoes 6 are provided with tail portions 6ª so as to give a long bearing with the friction surface of the drum 3. It will be noted that the guides 9 form a long bearing for the forward side of the shoes 6. The operation of this form of the invention is quite simple. As the drive shaft is rotated, and with it the cam 7, the clutch shoes are forced outwardly in a radial direction against the friction surface of the drum, thus effecting the drive between the drive shaft 1 and the driven shaft 2.

What I claim as my invention is:

In a friction clutch, the combination of a driven shaft; a drum secured thereto formed with an annular internal friction surface; a drive shaft; a hub concentric with the driven shaft; guides on said hub projecting within the drum; clutch shoes supported at their front and rear sides by said guides and slidable radially of the drum; a cam on the drive shaft adapted, when the said shaft is driving, to move said clutch shoes outwardly into frictional engagement with the internal friction surface of the drum, each of said clutch shoes being provided with a rearward extension of the drum engaging surface extending over the guide at the rear of the shoe.

Signed at the city of Toronto, Canada, this 14th day of August, 1931.

JESSE H. TROMANHAUSER.